United States Patent [19]

McAuley

[11] Patent Number: 5,469,433
[45] Date of Patent: Nov. 21, 1995

[54] SYSTEM FOR THE PARALLEL ASSEMBLY OF DATA TRANSMISSIONS IN A BROADBAND NETWORK

[75] Inventor: Anthony J. McAuley, Glen Ridge, N.J.

[73] Assignee: Bell Communications Research, Inc., Livingston, N.J.

[21] Appl. No.: 235,062

[22] Filed: Apr. 29, 1994

[51] Int. Cl.⁶ .................................................. H04L 12/56
[52] U.S. Cl. .......................... 370/60; 370/94.1; 370/99
[58] Field of Search .................................. 370/58.2, 58.3, 370/60, 61, 79, 82, 85.2, 91, 92, 93, 94.1, 94.2, 105, 99, 105.1, 43

[56] References Cited

U.S. PATENT DOCUMENTS

| | | | |
|---|---|---|---|
| 4,316,283 | 2/1982 | Olug | 370/94.1 |
| 4,899,333 | 2/1990 | Roediger | 370/94.1 |
| 5,164,938 | 11/1992 | Jurkevich et al. | 370/60 |
| 5,229,992 | 7/1993 | Jurkevich et al. | 370/94.1 |
| 5,282,207 | 1/1994 | Jurkevich et al. | 370/95.1 |

*Primary Examiner*—Melvin Marcelo
*Assistant Examiner*—Ricky Ngo
*Attorney, Agent, or Firm*—Leonard Charles Suchyta; James W. Falk

[57] ABSTRACT

The present invention is generally directed to the transmission of data in various types of communication systems, including local area networks (LANs) and wide area networks (WANs). A main object of the present invention is to provide a system based on a parallel structure that can assemble and disassemble packet information in constant time, no matter how corrupted, out of order, or duplicated the arriving packets. A further object of the present invention is to provide a system that would improve efficiency in broadband networks, particularly if implemented in a VLSI chip using the low complexity architecture-and-reassembly of the present invention.

22 Claims, 11 Drawing Sheets

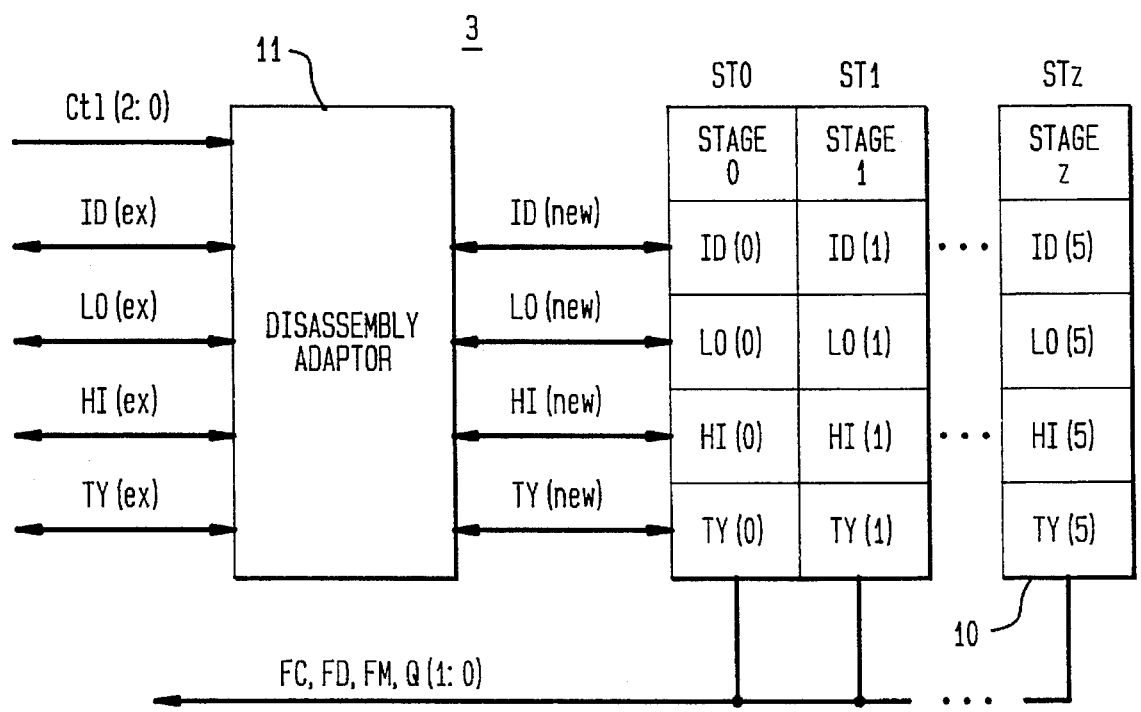

FIG. 6A

|    | ST0 | ST1 | ST2 | ST3 | ST4 | ST5 |
|----|-----|-----|-----|-----|-----|-----|
| ID | 5   |     |     |     |     |     |
| LO | 26  |     |     |     |     |     |
| HI | 30  |     |     |     |     |     |
| TY | M   |     |     |     |     |     |

WRITING (5, 26, 30, M) . Q=+1, FC=0, FD=0

FIG. 6B

|    | ST0 | ST1 | ST2 | ST3 | ST4 | ST5 |
|----|-----|-----|-----|-----|-----|-----|
| ID | 5   | 5   |     |     |     |     |
| LO | 26  | 36  |     |     |     |     |
| HI | 30  | 45  |     |     |     |     |
| TY | M   | S   |     |     |     |     |

WRITING (5, 36, 45, S) . Q=+1, FC=0, FD=0, FM=0

FIG. 6C

|    | ST0 | ST1 | ST2 | ST3 | ST4 | ST5 |
|----|-----|-----|-----|-----|-----|-----|
| ID | 5   | 5   |     |     |     |     |
| LO | 26  | 36  |     |     |     |     |
| HI | 35  | 45  |     |     |     |     |
| TY | E   | S   |     |     |     |     |

WRITING (5, 31, 35, E) . Q=0, FC=0, FD=0, FM=0

FIG. 6D

|    | ST0 | ST1 | ST2 | ST3 | ST4 | ST5 |
|----|-----|-----|-----|-----|-----|-----|
| ID | 5   | 5   |     |     |     |     |
| LO | 26  | 36  |     |     |     |     |
| HI | 35  | 45  |     |     |     |     |
| TY | M   | S   |     |     |     |     |

WRITING (5, 36, 45, S) . Q=0, FC=0, FD=1, FM=0

FIG. 6E

|    | ST0 | ST1 | ST2 | ST3 | ST4 | ST5 |
|----|-----|-----|-----|-----|-----|-----|
| ID | 3   | 3   | 5   |     |     |     |
| LO | 26  | 36  | 56  |     |     |     |
| HI | 35  | 45  | 58  |     |     |     |
| TY | E   | S   | E   |     |     |     |

WRITING (5, 56, 58, E) . Q=+1, FC=0, FD=0, FM=0

FIG. 6F

|    | ST0 | ST1 | ST2 | ST3 | ST4 | ST5 |
|----|-----|-----|-----|-----|-----|-----|
| ID | 5   | 5   |     |     |     |     |
| LO | 26  | 36  |     |     |     |     |
| HI | 35  | 58  |     |     |     |     |
| TY | E   | C   |     |     |     |     |

WRITING (3, 46, 55, M) . Q=-1, FC=1, FD=0, FM=0

FIG. 7A

|    | ST0 | ST1 | ST2 | ST3 | ST4 | ST5 |
|----|-----|-----|-----|-----|-----|-----|
| ID | 5   | 5   | 7   |     |     |     |
| LO | 26  | 36  | 16  |     |     |     |
| HI | 35  | 58  | 33  |     |     |     |
| TY | E   | C   | S   |     |     |     |

WRITING (7, 16, 33, S) . Q=+1, FC=1, FD=0, FM=0

FIG. 7B

|    | ST0 | ST1 | ST2 | ST3 | ST4 | ST5 |
|----|-----|-----|-----|-----|-----|-----|
| ID | 5   | 7   |     |     |     |     |
| LO | 26  | 16  |     |     |     |     |
| HI | 35  | 33  |     |     |     |     |
| TY | E   | S   |     |     |     |     |

READING (COMPLETE) . Q=−1, FC=0, FD=0, FM=0

FIG. 7C

|    | ST0 | ST1 | ST2 | ST3 | ST4 | ST5 |
|----|-----|-----|-----|-----|-----|-----|
| ID | 5   | 7   |     |     |     |     |
| LO | 16  | 16  |     |     |     |     |
| HI | 35  | 33  |     |     |     |     |
| TY | C   | S   |     |     |     |     |

WRITING (5, 16, 25, S) . Q=0, FC=1, FD=0, FM=0

FIG. 7D

|    | ST0 | ST1 | ST2 | ST3 | ST4 | ST5 |
|----|-----|-----|-----|-----|-----|-----|
| ID | 5   | 7   | 7   |     |     |     |
| LO | 16  | 16  | 50  |     |     |     |
| HI | 35  | 33  | 56  |     |     |     |
| TY | C   | S   | E   |     |     |     |

WRITING (7, 50, 56, E) . Q=+1, FC=1, FD=0, FM=0

FIG. 7E

|    | ST0 | ST1 | ST2 | ST3 | ST4 | ST5 |
|----|-----|-----|-----|-----|-----|-----|
| ID | 5   | 7   | 7   |     |     |     |
| LO | 16  | 26  | 50  |     |     |     |
| HI | 35  | 33  | 56  |     |     |     |
| TY | C   | M   | E   |     |     |     |

MATCHING (WITH ID=7) . Q=0, FC=1, FD=0, FM=1

FIG. 7F

|    | ST0 | ST1 | ST2 | ST3 | ST4 | ST5 |
|----|-----|-----|-----|-----|-----|-----|
| ID | 5   | 7   |     |     |     |     |
| LO | 16  | 50  |     |     |     |     |
| HI | 35  | 56  |     |     |     |     |
| TY | C   | E   |     |     |     |     |

READING (MATCH) . Q=-1, FC=1, FD=0, FM=1

SYSTEM FOR THE PARALLEL ASSEMBLY OF DATA TRANSMISSIONS IN A BROADBAND NETWORK

BACKGROUND OF THE INVENTION

1. Field of the Invention

The present invention relates to the transmission of data in various types of communication systems, including local area networks (LANs) and wide area networks (WANs).

2. Related Art

In such communication systems, the data being transferred between an origin and a destination is formatted into specific data packets in order to better transmit that data. Packet communication requires some processing on every packet, such as searching (e.g., to find a packet's route) and sorting (e.g., to allocate resources). The high speed and small packet size used on broadband networks increase the processing required for these per-packet functions, making systems that incorporate parallel processing structures attractive.

Protocols associated with the transmission of the data are often used to assemble individual packet information to provide useful functions or to reduce storage and improve communication efficiency. Errors can occur in transmitting such data, however, causing the data packets to be corrupted, out of order, or duplicated when received.

Processing required for assembly depends on how the network and receiver process packets. The effect of a network on a stream of packets depends on whether the network is configured to provide "guaranteed" or "best-effort" service. Typically, a network may be configured to operate in a "guaranteed" service format, without excessive complexity, then to operate in its excess bandwidth with a "best-effort" service format.

In a "guaranteed" service format, a network allocates its resources (i.e., reservation of bandwidth) to insure data arrives without congestion loss or misordering, so that data is received in the order sent, with only jitter introduced by the network. A network with a conventional "guaranteed" service format is designed to provide service with a data packet loss of better than $10^{-6}$. If a network reaches its capacity in transmitting or handling data and thus is unable to handle additional data, any additional connection into the network would be refused. A "guaranteed" service format simplifies the assembly function. For example, in an asynchronous transfer mode (ATM) operation (which guarantees the ordering of the data), packet descriptors in each cell are not required. Consequently, the amount of data in each data packet can be much greater in an ATM operation. However, a "guaranteed" service format may reduce the total throughput of data transmission and increase set-up latency. Throughput can be reduced as a result of the network's resources sharing/allocation being more constrained as the network reaches its capacity; and of limitations on routing (e.g., no multi-path routing) inherent in the network. Set-up latency of at least the first data packet may increase, because any reliable allocation of the network's resources requires end-to-end communication before transmission of the data can begin.

With a "best-effort" service format, data packet loss is tolerated. Also, a "best-effort" service formatted network tolerates more corrupted, misordered, or duplicated data packets. This service format, however, allows the flexibility of being able to drop or re-route packets during congestion, thereby allowing the network to be run at a higher utilization level. Moreover, specific resource reservation for the transmission of data is not required. Thus, the network in a "best-effort" service format can offer lower set-up latency. Overall, "best effort" services can lower overall system costs, provided the assembly problems caused by misordering and congestion loss can be economically dealt with.

The effect of receiver protocol processing on a stream of packets depends on whether the receiver assembles data physically or virtually.

With physical assembly, the receiver buffers data in a reorder buffer until all the previous data have arrived. This buffering eliminates the need for detection of duplicates because duplicates can be written multiple times into the buffer without affecting protocol processing. Physical assembly simplifies the assembly functions, but reduces average throughput and increases worst-case latency. Less restrictive forms of assembly (i.e., virtual assembly) can improve throughput and reduce latency. In comparing physical assembly to virtual assembly, individual average throughputs and set-up latencies are comparable. However, in comparing the performance level of virtual assembly with physical assembly in worst-case scenarios, the performance level of virtual assembly generally is better.

With cut-through processing, the receiver processes data as it arrives, with, at most, a simple FIFO queue. Although some protocol functions cannot operate in this cut-through mode (e.g., cipher-block-chained encryption), it is often possible to provide almost equal functionality without the ordering constraints. Cut-through processing requires fewer buffers, increases throughput, and reduces worst-case latency. On the other hand, cut-through processing increases assembly function complexity.

SUMMARY OF THE INVENTION

A main object of the present invention is to provide a system based on a parallel structure that can assemble and disassemble packet information in constant time, even though the arriving packets are corrupted, out of order, or duplicated.

A further object of the present invention is to provide a system that would improve efficiency in broadband networks, particularly if implemented in a VLSI chip using the low complexity architecture-and-reassembly of the present invention.

Another object of the present invention is an assembly system and structure advantageously applicable to various types of communication. For example, the assembly functions of the present invention would allow more efficiency both in detecting complete error detection blocks, and in detecting when all operands have arrived for a distributed computation. The system of the present invention would enable selective acknowledgment of when and what types of data are received when assembling information for a network, thereby reducing the amount of memory or storage required for assembling the information.

BRIEF DESCRIPTION OF THE DRAWINGS

The invention is better understood by reading the following Detailed Description of the Preferred Embodiments with reference to the accompanying drawing figures, in which like reference numerals refer to like elements throughout, and in which:

FIG. 3b illustrates the architecture for an assembly device having z stages according to the present invention;

FIGS. 6(a)–6(f) illustrate the sequence of a first set of data packets being assembled in stages via primitive assembly functions according to the present invention;

FIGS. 7(a)–7(f) illustrate the sequence of first and second sets of data packets being assembled simultaneously in the same stages via primitive assembly functions according to the present invention;

FIG. 9 shows a function table representative of the logic incorporated into the write process in a single stage of the system.

DETAILED DESCRIPTION OF THE PREFERRED EMBODIMENTS

Figure 1:
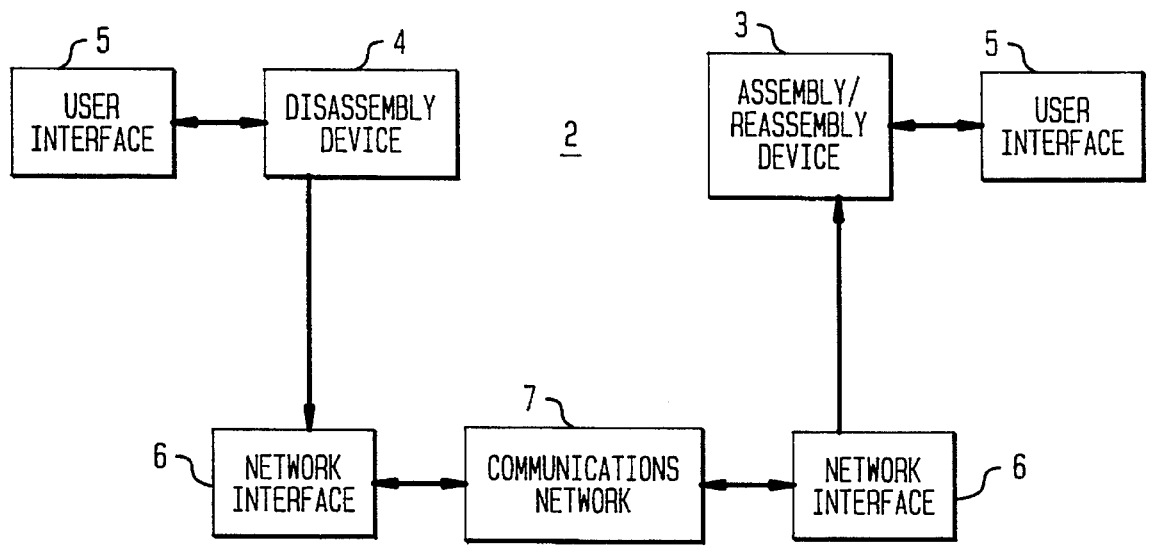
FIG. 1 illustrates a system block diagram of the general application and implementation of a preferred embodiment of the present invention.

In describing preferred embodiments of the present invention illustrated in the drawings, specific terminology is employed for the sake of clarity. However, the invention is not intended to be limited to the specific terminology so selected, and it is to be understood that each specific element includes all technical equivalents that operate in a similar manner to accomplish a similar purpose.

For purposes of describing the invention, independent data blocks will be defined as contiguous spans of data, wherein each word of data in a span or block has a unique sequence number; a data block is a complete set of data that is processable at a higher level. A packet of data is defined as any contiguous span of data in the block that is independently processable.

In a preferred embodiment of the present invention, the system is directed to the structure and operation for the disassembly and assembly/reassembly of data packets transmitted in a communication system, such as a network. To facilitate the organization of the data packets being transmitted, especially in communication systems where packets of data from different blocks or applications are multiplexed together, each data packet includes a packet descriptor data set of packet descriptors that uniquely describes that data packet. These packet descriptors (PD) or descriptor variables are formatted as follows:

PD={ID, LO, HI, TY} where

ID is the k-bit connection identifier.

LO is the n-bit start sequence number of a data span in the packet.

HI is the n-bit end sequence number of a data span in the packet.

TY is the 2-bit packet type (S,M,E or C).

The ID, LO and HI descriptors are numerical values as described above. The TY packet type descriptor indicates the relationship of the data span in the packet to a completed data block as a whole. The type descriptors are:

S=the starting packet of the block,

M=any middle packet of; data of the block,

E=the ending packet of the block, and

C=describing a complete data block.

A complete block of data has all of the starting, middle and ending packets.

As illustrated in FIG. 1, the present invention would generally be applicable to a networked communication system 2 that incorporated, among other features, an assembly/reassembly device 3 for assembling data packets transmitted through the network into complete data blocks, a disassembly device 4 for converting data blocks into the data packets for transmission through a communications network 7, user interface 5 for allowing communication between a user and each of the assembly/reassembly 3 and disassembly devices 4, and network interfaces 6 for connecting each of the devices 3, 4 with the communications network 7.

In the disassembly device 4, the disassembly operation takes place as follows:

An accounting of the data packets to be disassembled is made.

A packet descriptor of a selected packet(s) is (are) then extracted.

The accounting is then updated to remove the selected packet(s) indicating that the packet(s) has/have been manipulated.

Figure 2A:
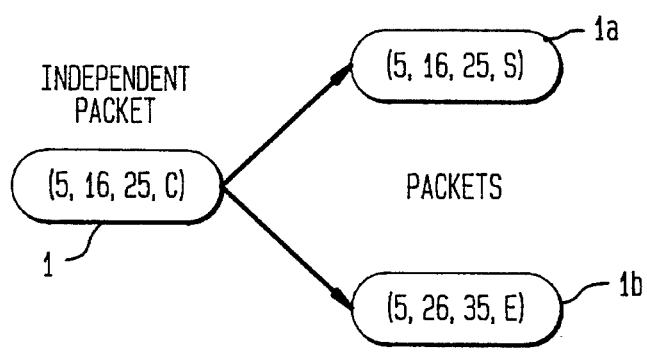
FIG. 2a illustrates the disassembly of an independent data packet for manipulation in accordance with the present invention.

FIG. 2a illustrates an example of the disassembly of an independent packet 1 represented by its packet descriptor data set into two 10-word packets 1a, 1b. The packet 1 as shown is from a connection having an ID of 5, that has 20 words of data starting at sequence number 16 and ending at sequence number 35. The packet descriptor data set is thus shown as PD={5,16,35, C}.

With the assembly/reassembly device 3, the following operations occur with each packet manipulated:

A minimum packet accounting is generated.

Complete data blocks are detected.

Duplicate data packets are detected.

These three operations are the same, whether the device 3 operates with either physical or virtual assembly/reassembly of data packets. With physical assembly, data packets are buffered until a complete data block is detected. Virtual assembly also incorporates the detecting of complete data blocks, but does not buffer or reorder the arriving data packets. Virtual assembly can thus reduce set-up latency and have greater data throughput. However, in order to prevent duplicate information problems in other processing functions at the receiver (e.g., a function that calculates the parity of data received), virtual assembly must include the operation of detecting duplicate data.

For assembly, the arrows as represented in FIG. 2a would simply be reversed. In other words, the two 10-word packets 1a, 1b can be assembled into the 20-word independent packet 1. However, if the network with which the system is communicating introduces some randomness, assembly is more complex.

The process of assembly and/or its operational requirements in a network vary based on:

Communication speed (bits/second).

Packet size (bits/packet).

Number of parallel assemblies.

Degree of randomness.

Network randomness causes a packet to be misordered relative to previous packets, the duplication of previous packets, overlaps of previous packets, or the corruption of the packet descriptors.

Figure 2B:
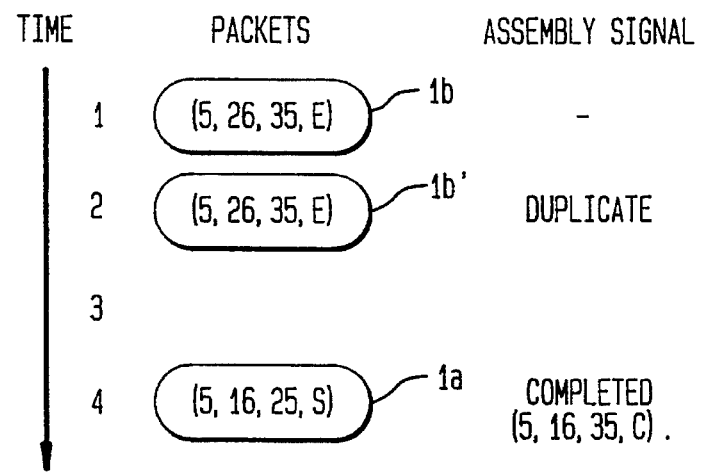
FIG. 2b illustrates the assembly of misordered and duplicate data packets in accordance with the present invention.

For example, FIG. 2b illustrates the assembly operation with misordered and duplicate packets. At time t=1, the misordered packet 1b (for example, {5, 26, 35, E}) would be received in memory. At time t=2, the arrival of a duplicate packet 1b' into memory would be signalled. At time t=4, the two unique packets 1a, 1b would be assembled into the data block described as PD={5, 16, 35, C}, and then the presence of a complete block would be detected.

Duplicate packets may be either complete or partial duplicates of prior-received data packets. The above example duplicate packet 1b' ({5, 26, 35, E}) would be categorized a complete duplicate.

Overlaps are partial duplicates of prior-received data packets that have been stored in the memory. For example, as shown in FIG. 2b, if a packet 1b" {5, 26, 30, M} had arrived at time t=3, this would have an overlap with the packet 1b ({5, 26, 35, E}).

A corrupted packet contains incorrect packet descriptor data. For example, if the packet 1a ({5, 16, 25, S}) that arrived at time t=4 was corrupted, it might appear with a packet descriptor data set of {5,16, 25, M}. Corrupted packets are handled depending upon the specific application of the system. One way of handling corrupted packets is to discard them, and then proceed with processing the next incoming data packet.

One of the main advantages of the present invention. is that the assembly operation is designed to be concerned only with errors or randomness that affect the packet descriptors, not the actual data.

In a first embodiment of the present invention, the system of the invention incorporates a parallel structure and operation in which assembly or disassembly occurs in constant time, independent of the number of parallel streams of of the randomness of arriving data.

Figure 3A:
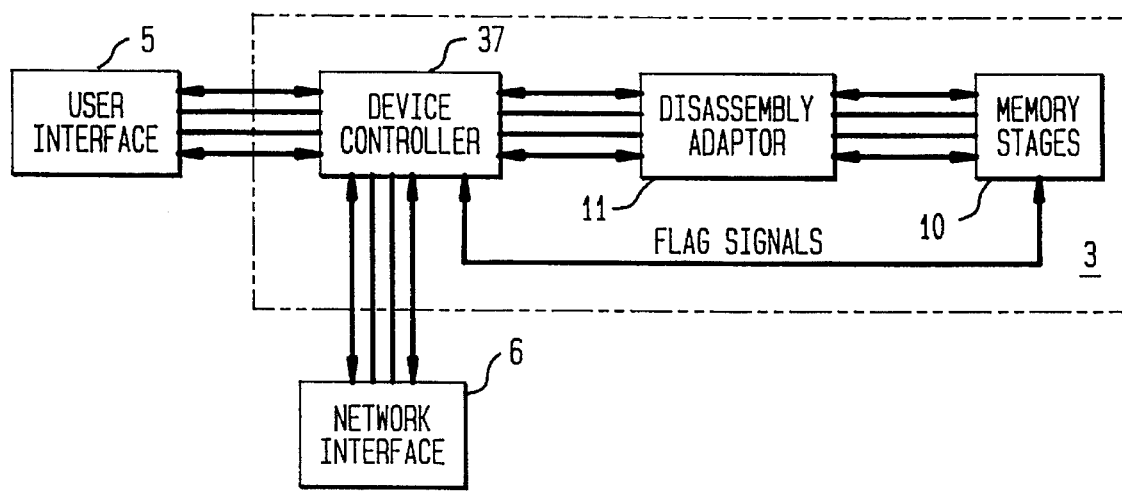
FIG. 3a illustrates a general system block diagram of the assembly/reassembly device according to the present invention.

As shown in FIG. 3b, the system utilizes a parallel process in conjunction with z computational stages 10 numbered St0 to Stz−1, where each of the z stages 10 (i=0 to z−1) stores a single packet descriptor data set: PD[i]={ID[i], LO[i], HI[i], TY[i]}. FIG. 3a illustrates a system block diagram of an assembly/disassembly device 3, where the device 3 is connected to each of a user interface 5 to allow communication with a user, and a network interface 6 to allow communication with the network through which the data is transmitted. Within the assembly device itself, a set of memory stages 10 that are connected in parallel with one another are connected to a device controller 37 that controls the receiving, outputting, and storing of packet descriptor data sets in the memory stages 10. A disassembly adaptor 11 optionally can be connected between the device controller 37 and the memory stages 10 if the device is intended to perform disassembly functions as well as assembly/reassembly. Packet descriptor data sets are transmitted between the device controller 37 and the memory stages 10 through the disassembly adaptor 11. The device controller 37 also is connected to the memory stages 10 through a FLAG SIGNALS line in order to receive data on and control the status of flags in the individual memory stages.

FIG. 3b illustrates the architecture for the assembly/reassembly device 3 having z stages in the memory stages 10 in connection with the disassembly adaptor 11.

Figure 4:
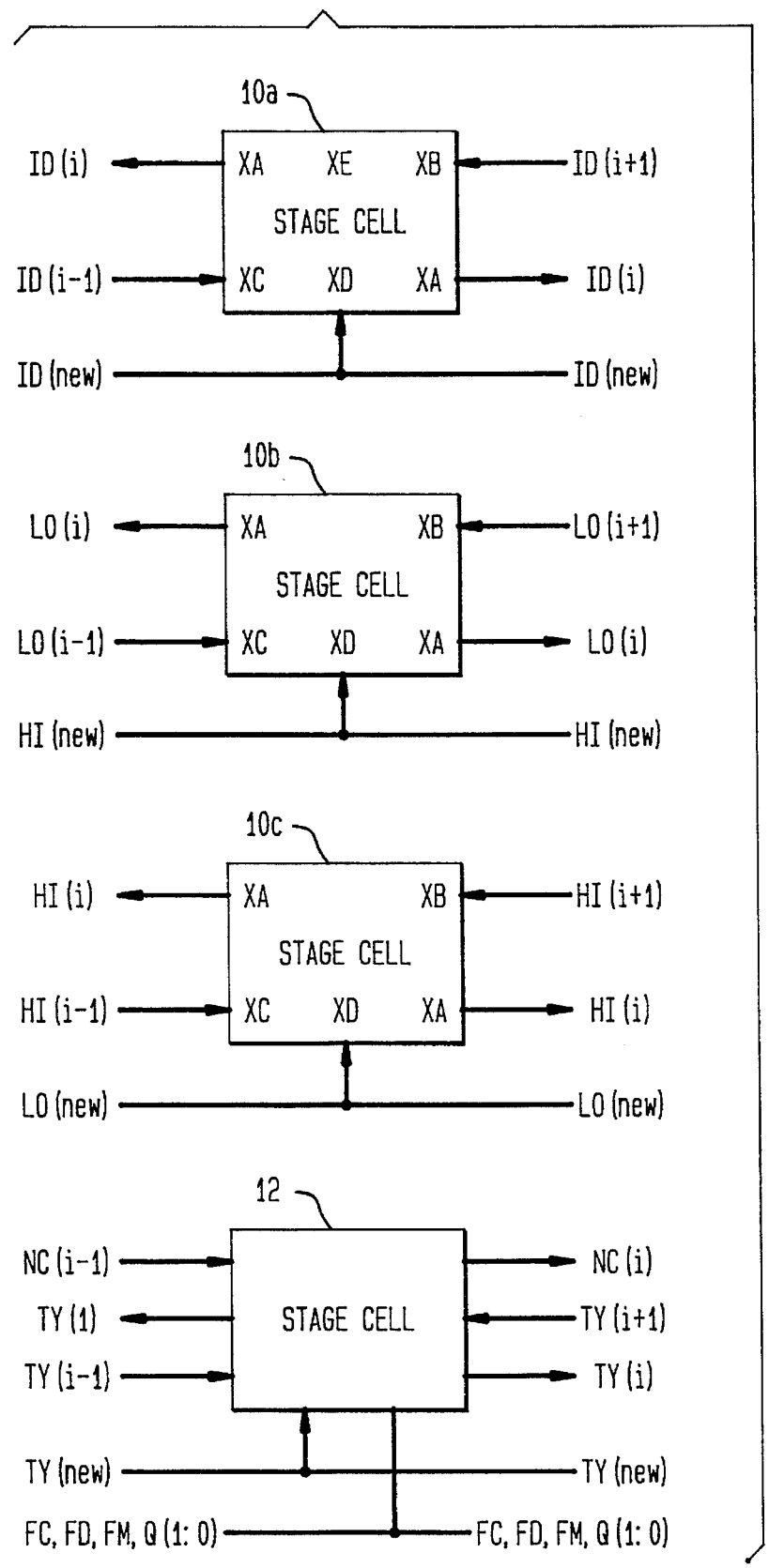
FIG. 4 is a system block diagram of a single stage of the present invention.

FIG. 4 shows the architecture within each stage 10. In general, the stages St0 to Stz are connected in parallel to each other for receiving data on new packet descriptor sets (PD[new]={ID[new], LO[new], HI[new], TY[new]}).

FIG. 4 illustrates a block diagram of a single stage, built from three stage cells 10a–10c, and a stage controller 12. As shown, the stage cells 10a–10c are then each connected to further receive packet descriptor data sets from corresponding stage cells of an adjacent downward or succeeding stage, while outputting packet descriptor data sets to the corresponding stage cells in an adjacent upward or preceding stage or to the stage controller 12. Each of the memory stages 10 also is connected to output from its stage controller 12 the state of a series of flags for signalling the results of the primitive functions performed in a stage to the device controller 37 (See FIG. 3a). The flags include:

Q=the change in total storage (−1, 0, +1).

FC=1 if any TY[i]=C.

FD=1 if PD[new] is a duplicate.

FM=1 if any MF[i]=1.

Each stage 10 performs the assembly process and outputs a status flag (2-bit Q-bus), a complete packet flag (1-bit FC-line), a duplicate flag (1-bit FD-line), and a match flag (1-bit FM-line) to the device controller. The stage controller 12 also internally maintains a valid flag (VA[i]) to indicate valid packet descriptors, and a match flag (MF[i]) to remember the occurrence of matches.

If the system is formed to be able to disassemble as well as assemble, the disassembly adaptor 11 (See FIG. 3b) is connected to the stages 10 so as to input new packet descriptor data PD[new] to the stages. The disassembly adaptor 11 is further connected to transmit or receive external packet descriptor data sets (PD[ex]={ID[ex], LO[ex], HI[ex], TY[ex]}) that either have been disassembled or must be assembled, respectively, based on the commands of the device controller 37. In one application of the system, external packet descriptor data sets would originate from an internal broadcast bus.

Figure 5:
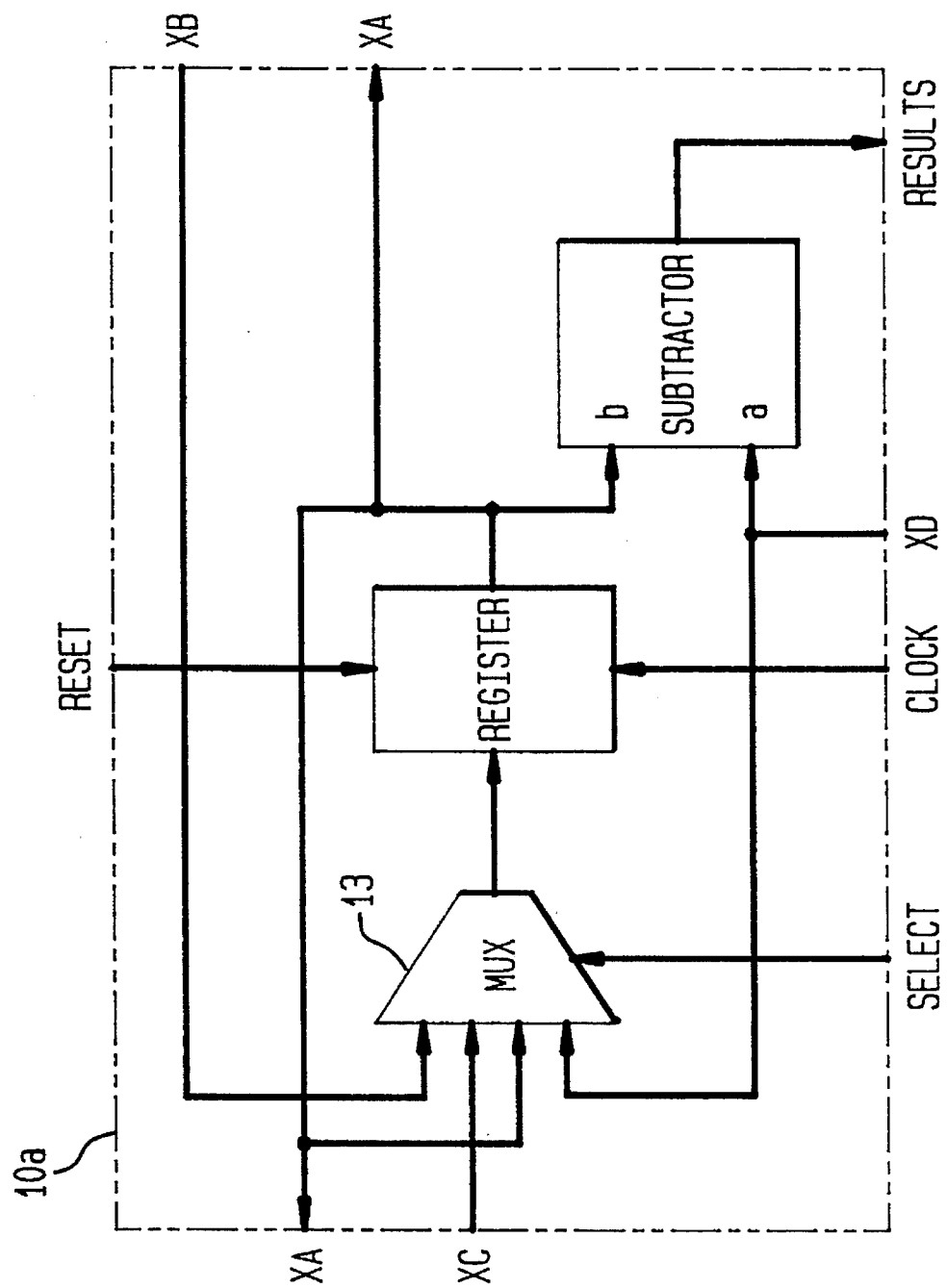
FIG. 5 shows a general circuit diagram of a single stage cell incorporated into a stage in accordance with FIG. 4.

FIG. 5 illustrates a typical stage cell 10 with four data ports XA, XB, XC, and XD; three control inputs RESET, SELECT, and CLOCK; and an output RESULTS. The subtractor 15 calculates the difference between two inputs, then indicates whether the difference is greater than (>), less than (<), or equal (=) to a hard-wired value of +1, 0 or −1. The stage controller 12 uses these results (along with other inputs) to decide the value of the SELECT line. Depending on the value of the SELECT line, the multiplexer 13 will load its register 14 from one of four possible sources (see FIG. 4) in order to determine its course of action:

Port XA keeping its existing value

Port XB loading the upward value

Port XC loading the downward value

Port XD loading the new value

The three stage cells 10a–10c are controlled separately. Thus, for example, LO[i] outputted from stage cell 10b might maintain its existing value while HI[i] outputted from stage cell 10c loads the new value.

The stage controller 12 is a small finite-state machine that controls the operation of the three stage cells 10a–10c. Its operation is derived from the process of the system. All the differences (<, =, or >) as discussed above are calculated by the stage cells 10a–10c.

As noted earlier, each stage Sti can store a single packet descriptor data set (PD[i]={ID[i], LO[i], HI[i], TY[i]}), receive a new packet descriptor data set (PD[new]), or receive a packet descriptor data set from its upward (PD[i−1]) and downward PD[i+1] neighbors. Each stage can correspondingly set an FC-line, FD-line, FM-line, or Q-bus to output the corresponding flags. A no-change flag (ND[i]) is stored in each stage and outputted to its downward neighbor.

In operation, the system process maintains and applies two rule invariants:

I1. A minimum number of packet descriptor data sets will be maintained.

I2. Packet descriptor data sets will be stored in the lowest stages possible.

Rule invariant I1 means that packet descriptor data sets are combined as much as possible. For example, if a stage is currently holding the packet descriptor data set {5, 16, 25, S} and a new set {5, 26, 35, E} arrives, that stage would merge the two packet descriptor data sets into a single descriptor data set {5, 16, 35, C}.

Rule invariant I2 means that packet descriptor data sets are manipulated and thereby shifted to the lowest possible stage(s). For example, if stage St0 is vacant, all stages that follow St0 (St1 to Stz−1) also are vacant. These two invariants are maintained during the system's three primitive functions which are used in both assembly and disassembly:

Matching.

Reading.

Writing.

During matching, a new incoming packet descriptor data set (PD[new]) is inputted simultaneously to all stages. Each stage sets its match flag (MF[i]) if its ID[i]=ID[new]; all other match flags are reset. (MF[i]=0). If there is at least one match, the external match line is set (outputting FM=1); otherwise it is reset (FM=0). Matching does not change the total number of entries but indicates whether any stage is already storing a packet descriptor data set with a connection identifier ID the same as that of the new packet descriptor data set (PD[new]).

Reading takes out the matched entry (MF[i]=1) or the complete packet descriptor data set (TY[i]=C) from the stage storing it and puts it onto PD[new]. Matched entries can be read as long as the external match line is set (FM=1). Similarly, complete entries can be read as long as the external complete line is set (FC=1). The complete line is set if any stage has TY[i]=C. The read entry is deleted and upward stages to its right are shifted downward or to the left to maintain rule invariant I2.

TABLE 1

Effects of writing a new packet descriptor on the flag Q showing the change in the number of packet descriptors.

| Effect of a new descriptor | Q |
|---|---|
| Add a new location | +1 |
| Merge with existing location | 0 |
| Combine two existing locations | −1 |
| Detected as a duplicate | 0 |

During writing, the new packet descriptor data set (PD [new]) is broadcast simultaneously to all stages. After writing, the change in status (Q) in the total number of packet descriptor data sets may increase by one (Q=+1) if the packet descriptor data set is written into a new location as is, stay the same (Q=0) for a merged (or duplicate) entry, or reduce by one (Q=−1) for a combining entry (see Table 1). Duplicate entries cause the external duplicate line of an affected memory stage to set its flag (FD=1). Which operation (see Table 1) is performed depends on the overlap between PD[new] and existing packet descriptor data sets. The Q-status and FD flags are valid only for the current operation; but the FC and FM flags remain set until all entries causing those flags to be set are read (or another match operation is performed).

FIGS. 6(a)–6(f) and FIGS. 7(a)–7(f) illustrate the resulting states from twelve example primitive functions, where each stage is represented by a column, with the leftmost column being stage St0 and the rightmost column being stage St5 (z=6 stages).

FIG. 6a shows the first packet descriptor data set {5, 26, 30, M} being written into a new stage (stage St0) setting the status flag positive (Q=+1). FIG. 6b shows the second packet descriptor data set {5, 36, 45, S} being written into a new stage (stage St1). The third packet descriptor data. set {5, 31, 35, E} immediately follows the first descriptor, so the assembly operation merges it with the contents of stage St0 (see FIGS. 6c) resetting the status flag (Q=0). FIG. 6d shows the packet descriptor data set {5, 36, 45, S} causing no change except for the indication of a duplicate packet, thereby setting the duplicate flag (FD=1). In essence, the data packet with the packet descriptor data set of {5, 36, 45, S} is discarded.

FIG. 6e shows the packet descriptor data set {5, 56, 58, E} being written into a new stage (stage St2). FIG. 6f shows the packet descriptor data set {5, 46, 55, M} that combines two existing entries setting the status flag negative (Q=−1), and causes the complete flag to indicate a completed block of data (FC=1).

FIG. 7a shows the first packet descriptor data set from another application {7, 16, 33, S} being written into a new stage St2. FIG. 7b shows the reading of the first complete packet descriptor data set {5, 36, 58, C} out of stage St1. FIG. 7c shows the packet descriptor data set {5, 16, 25, S} merging with stage St0. FIG. 7d shows the packet descriptor data set {7, 50, 56, E} being written into a new stage St2. FIG. 7e shows matching all entries with ID=7, causing the two entries to be marked and the match flag to be set (FM=1). FIG. 7f shows reading the first matched entry {7, 26, 33, M}. The match flag FM remains high because there are more matched entries (in this case only one {7, 50, 56, E}).

All stages in the system perform the same process at the same time. The match and read operations are similar and applicable to the operation of a Content Addressable Memory (CAM). However, one of the primary features and advantages of the present invention is the write operation.

Figure 8:
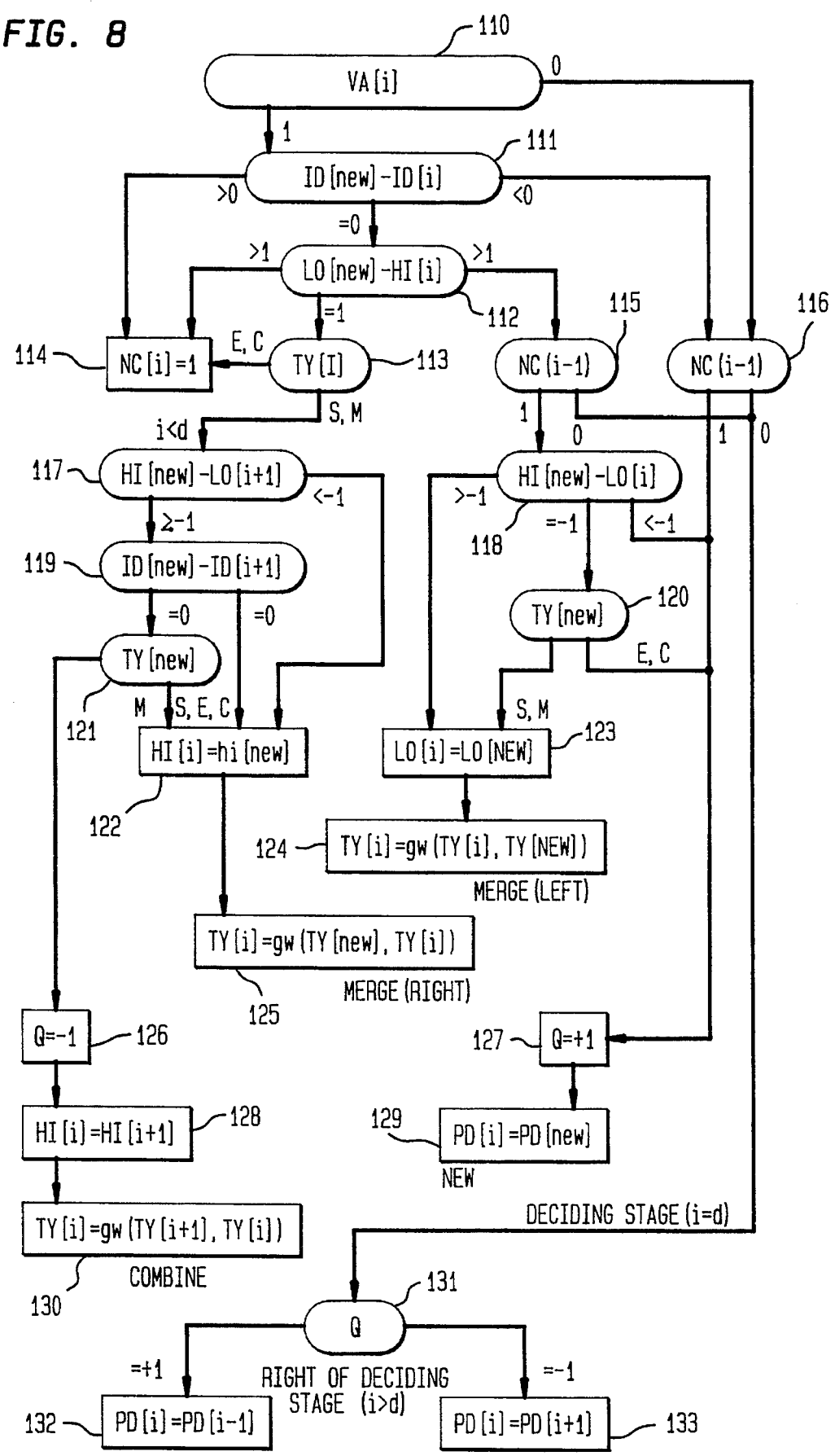
FIG. 8 shows a flow chart of the write process incorporated in the system of the present invention.

FIG. 8 illustrates a flow chart of the write process of the system used in parallel by each stage. Each stage generates a series of choices (represented by the multiple oval outputs) that direct the stage to make specific changes to specific flags and/or packet descriptors (represented by the contents of the rectangles). For example, at step 110, if VA[i]=1, the next choice will be step 111. However, if VA[i]=0, the next choice will be made at step 116. No matter what path as determined by the choices made is taken by each stage, each stage will always go to a rectangle that will indicate what state changes should be made. At step 110, vacant stages have their sequence descriptors LO and HI and their valid flags reset (LO[i]=HI[i]=0 and VA[i]=0). Occupied stages (VA[i]=1) set a no-change flag (NC[i]=1) at step 114 if they individually determine that they will be unaffected by PD[new]; all other stages leave NC[i]=0. The deciding stage Std is defined as the first stage that may be affected (NC[i]=O) and determines that NC[i−1]=1 (the stage Std detects NC[−1]=

1). All stages upward or to the right (i>d) of the deciding stage Std (NC[i=1]=0) change state based on the value of the status flag Q. Specifically, they shift upward or right if Q=+1, shift downward of left if Q=−1, or remain the same if Q=0. The middle of FIG. 8 shows the core of the write process used by the deciding stage Std (error conditions that result in a duplicate flag and no change in internal state are not shown).

The logic incorporated into a write circuit for determining TY[i] in a stage can be equated to a function table. The non-commutative write function gw realized by the table and thus the circuit, shown in FIG. 9, has two inputs (TYa and TYb) and a single output (TYc) where the function operates as:

$$TYc = gw(TYa, TYb)$$

TYa is defined as the 2-bit packet type of the new packet descriptor data set PD[new] (TY[new]) being written into the deciding stage Std. TYb is the 2-bit packet type of the packet descriptor data set currently in the deciding stage Std (i.e., PD[i]). TYc is the 2-bit packet descriptor data set that would result from the operation of the function gw (PD[new] merged with PD[i]). For example, with a middle (TYa=M) packet and a start (TYb=S) packet, the write circuit with the function gw returns a start packet (TYc=S). Since gw is a non-commutative function, specific combinations of TYa with TYb will set only a duplicate flag (FD[i]=1) or a no change flag (NC[i]=1) in the internal state of the deciding stage Std. The function gw defines these as error conditions that generate error flags (not described here) that are handled according to the specific application of the system. Based on the process defined in FIG. 9, the operation of FIG. 6e to FIG. 6f by writing {5, 46, 55, M} is as follows:

Stage St0 detects VA[i]=1, ID[new]-ID[i]=0, and LO[new]-HI[i]=11; and therefore sets NC[i]=1. Stage St1 detects VA[i]=1, ID[new]-ID[i]=0, LO[new]-HI[i]=1, TY[i]=S, HI[new]-LO[i+1]=−1, ID[new]-ID[i+1]=0, and TY[new]=M; and therefore sets Q=−1, HI[i]=H[i+1]=58, and TY[i]=C (TYa=E and TYb=S in FIG. 6). Stage St2 detects VA[i]=1, ID[new]-ID[i]=0, LO[new]-HI[i]=−12, NC[i−1]=0 and Q=−1; and therefore sets PD[i]=PD[i+1]. All other stages detect VA[i]=0, NC[i−1]=0, and Q=−1; and therefore set PD[i]=PD[i+1].

Figure 10:
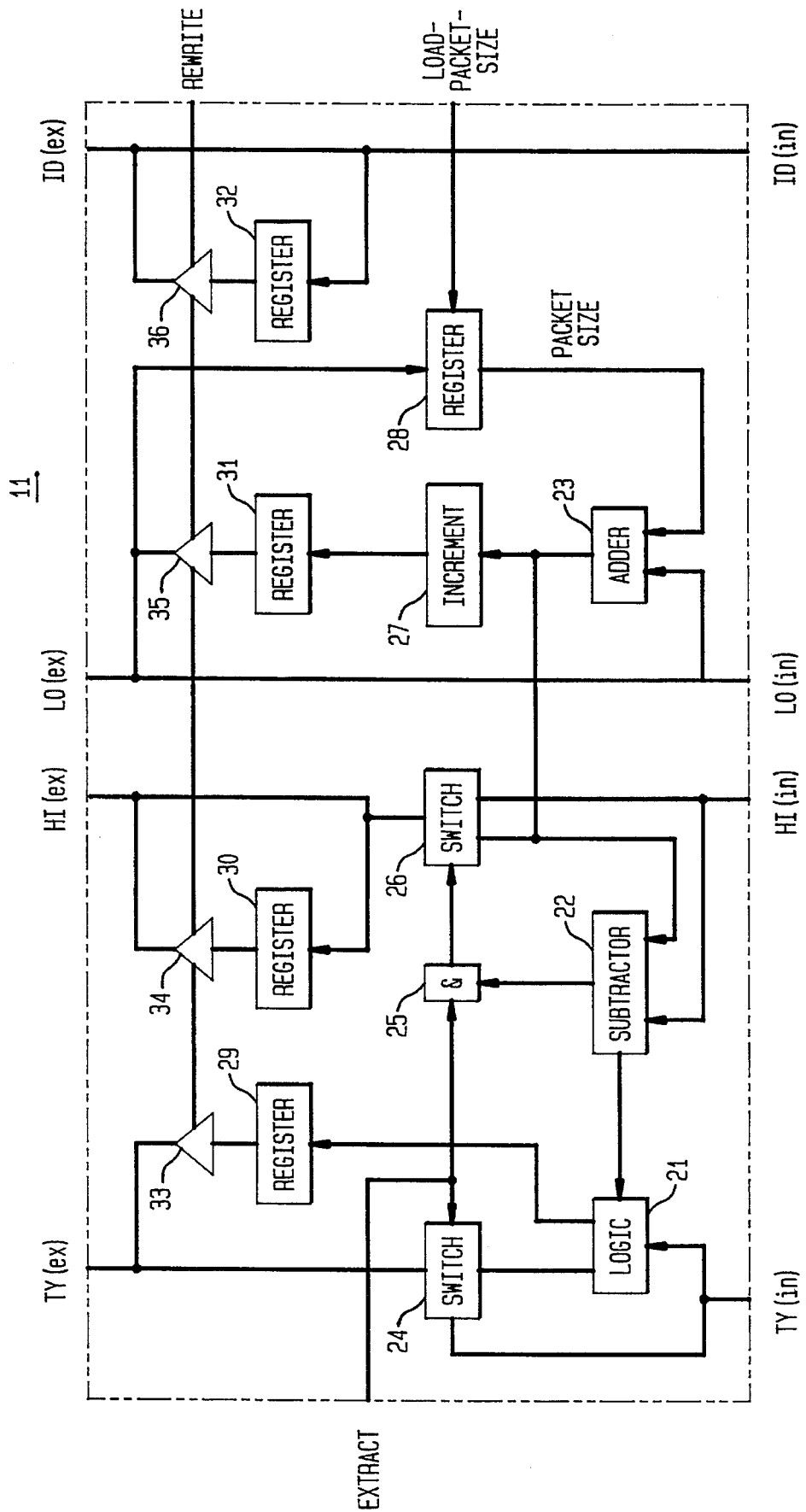
FIG. 10 shows one embodiment of a disassembly adaptor that would be incorporated into the present invention as illustrated in FIG. 3a or 3b.

FIG. 10 illustrates the structure for a disassembly adaptor 11 that interfaces between the internal (PD[in]) packet descriptor data set being processed and the external (PD[ex]) packet descriptor data set either incoming to be processed or being outputted after processing. The adaptor can optionally be incorporated into the system as noted above if the system is intended to perform both assembly and disassembly. The adaptor 11 consists of a simple finite state machine that can hold up to one packet descriptor in its internal memory represented by 29, 30, 31, and 32.

When assembling, the adaptor 11 simply passes information between PD[ex] and PD[in]. When disassembling, however, the adaptor 11 first extracts (extract=1) one packet descriptor set from PD[in] onto PD[ex]. Then, in the next cycle, the adaptor 11 rewrites (rewrite=1) the original PD[in] back onto PD[in], less the extracted packet descriptor set.

During the extraction process, the adaptor 11 adds the packet size to LO[in] using the adder 23. The packet size is initially loaded via LO[ex] (load-packet-size=1). If the result of the addition is smaller than HI[in] (compared using the subtractor 22), the adaptor passes the result onto HI[ex], or else it passes HI[in] onto HI[ex]. TY[ex] depends on the same comparison and the value of TY[in]. ID[in] is simply passed onto ID[ex].

During the rewrite process, the adaptor 11 puts the contents of the registers 28–32 onto ID[in], LO[in], HI[in], and TY[in]: LO[in] is one more than HI[ex] from the extraction process. TY[in] is determined by the old TY[in] and the comparison, while HI[in] and ID[in] are the same as in the extraction process. The old packet descriptor data set is not rewritten (since the span is used up).

The assembly process in the system of the present invention has various applications. A parallel assembly system using the process of the present invention can be most useful when the packet rate or number of parallel streams becomes extremely large, or when the randomness of the packet stream reaches a very high level, or even when such other conditions occur that would otherwise render simpler serial structures inadequate. The assembly system of the present invention can, for example, aid the segmentation function of a communication network by determining what packet to send next from a connection.

In one application of the system, information can be sent through a network about what data is intended to be sent. The information being sent out through the network is written into the assembly/reassembly device. To send a packet, the ID packet descriptor of the connection is matched, and then as many packets as are scheduled in a particular time slot are read. After each reading, the segmenter writes back the information it has not sent.

Similarly, for the reassembly function the assembly system is able to determine when a packet completes a reassembled block. This operation could be used, for example, when physically reassembling packets in a shared memory queue.

The assembly process and system are able to tell an error detector when to:

Compare the recalculated and sent parities; and

Abort processing duplicate data.

As each packet arrives, the packet descriptor data set is written into the assembler. When the assembler detects a complete error detection block (FC=1), the complete block is read. If virtual reassembly is being performed (e.g., with TCP checksum), the error detector is told to compare the associated sent and recalculated parities. If the assembly device detects a duplicate (FD=1), it sends a signal to the error detector to abort packet processing. By aborting duplicate data, the error detection function avoids unnecessarily corrupting the recalculated parity.

In another application, if an ARQ error correction system is being used, the assembly system is able to store and generate the contents of selective acknowledgement messages. When information about good error detection blocks (e.g., from the error detection system) is received, the information is written into the assembly device. When an acknowledgment message must be sent for a connection, matching is performed with the connection's ID packet descriptor. Then, all the matched packet descriptor data sets are read directly in the acknowledgment message. If a cumulative acknowledgment, is required, the same process is repeated, except that only the first HI-value (which is the required cumulative sequence number) is read.

In a further application of the assembly system, complete application blocks can be detected: commit messages would be sent as whole application data units arrive. At the same time, a different type of application can be found in parallel computation.

In the application of the system in parallel computation, the use of multiple packet sources increases the likelihood of misordering; operations therein must wait for all their operands to arrive. In a distributed system, for example, the operands may arrive from different physical locations. To detect when all the operands have arrived, the information would be written into the assembly system. If the information can be processed as it arrives using the assembly system, any duplicates could be detected to preserve the operation's integrity (the duplicates could be due to deliberate redundancy).

In one specific application of the assembly system of the invention, 1 micron CMOS technology would be used, with 32-bit sequence numbers and 32-bit identifiers in each stage (smaller sizes could be considered for many applications). A single-chip assembly unit would be designed to have 64 stages and run with a 40 Mhz clock cycle. If more stages are needed (e.g., for a file server with many active connections), the chips could be cascaded.

Modifications and variations of the above-described embodiments of the present invention are possible, as appreciated by those skilled in the art in light of the above teachings.

It is therefore to be understood that, within the scope of the appended claims and their equivalents, the invention may be practiced otherwise than as specifically described.,

What is claimed is:

1. In a telecommunications network, a method for assembling/reassembling data blocks from a plurality of data packets transmitted through the network, each data packet having packet descriptor data describing identity, data sequence start, data sequence end, and packet type of a corresponding data packet, the method comprising the steps of:

receiving an nth data packet to be assembled where n is a number of received data packets;

extracting nth packet descriptor data from the nth data packet;

comparing the nth packet descriptor data with at least mth packet descriptor data to determine if they are duplicates of each other and discarding the nth packet descriptor data if determined to be a duplicate with the mth packet descriptor data, where m is a number of prior stored packet descriptor data in memory, wherein at least the mth packet descriptor data is stored in a zth memory stage where z is a number of a memory stage among a plurality of memory stages;

comparing the nth packet descriptor data with at least the mth packet descriptor data to determine if a combination of at least the nth data packet with the mth data packet constitutes one of consecutive and overlapping data packets of a data block, and merging at least the nth and mth packet descriptor data if determined to constitute one of consecutive and overlapping data packets;

storing at least one of the nth packet descriptor data in a (z+1)th memory stage and the combination of at least the nth and mth packet descriptor data in a zth memory stage;

updating any packet descriptor data stored in the zth memory stage based on results of said step of comparing to determine consecutive and overlapping data packets;

determining whether any packet descriptor data stored in the memory stages include packet-type packet descriptor data designating a complete data block; and reading out packet descriptor data with packet-type packet descriptor data designating a complete data block from the memory stages.

2. A method for assembling/reassembling data blocks from a plurality of data packets as claimed in claim 1, wherein each data packet has a packet-type packet descriptor selected from one of a START, a MIDDLE, an END and a COMPLETE packet type, and when said step of comparing to determine one of consecutive and overlapping data packets determines that the combination does constitute one of consecutive and overlapping data packets, said step of updating the packet-type packet descriptor data in the packet descriptor data stored in the memory stages includes the steps of:

changing the packet-type to START when the packet-type of the nth packet descriptor data is MIDDLE and the packet-type of the mth packet descriptor data is START, changing the packet-type to COMPLETE when the packet-type of the nth packet descriptor data is END and the packet-type of the mth packet descriptor data is START, changing the packet-type to MIDDLE when the packet-type of the nth packet descriptor data is MIDDLE and the packet-type of the mth packet descriptor data is MIDDLE, changing the packet-type to END when the packet-type of the nth packet descriptor data is END and the packet-type of the mth packet descriptor data is MIDDLE, and maintaining a current packet-type for all other combinations of packet-types from the nth and mth packet descriptor data.

3. A method for assembling/reassembling data blocks from a plurality of data packets as claimed in claim 1, wherein the memory stages are connected in parallel to each other, the method further comprising the step of:

shifting storage of packet descriptor data in the parallel plurality of memory stages after said reading out of packet descriptor data with packet-type packet descriptor data designating a complete data block to cause only the lowermost stages of the parallel plurality of memory stages to be occupied.

4. In a telecommunications network, a method for disassembling data blocks in a plurality of data packets transmitted through the network and assembling/reassembling the plurality of data packets into data blocks, each data packet having packet descriptor data, the method comprising the steps of:

dividing a data block to be disassembled into a plurality of data packets;

inserting a packet descriptor data set into each data packet, the packet descriptor data set including an identity descriptor, a data sequence start descriptor, a data sequence end descriptor, and a packet type descriptor;

transmitting the plurality of data packets through the network;

receiving a first data packet to be assembled;

extracting a first packet descriptor data set from a first data packet;

comparing the first packet descriptor data set with prior packet descriptor data sets stored in memory to determine if the first packet descriptor data set is a duplicate of any prior packet descriptor data set and discarding the first packet descriptor data if determined to be a duplicate of at least one prior packet descriptor data set stored in memory, wherein each of the prior packet descriptor data sets is stored in one of a plurality of memory stages;

comparing the first packet descriptor data set with the prior packet descriptor data sets stored in memory to determine if a combination of the first data packet with at least one prior received data packet constitutes one of consecutive and overlapping data packets of a data block, and merging the first packet descriptor set and at least one prior packet descriptor data set stored in memory if determined to constitute one of consecutive and overlapping data packets;

storing at least one of the first packet descriptor data set in a next first empty memory stage, and the combination of the first and at least one prior packet descriptor data set in a memory stage currently occupied by the at least one prior packet descriptor data set;

updating the packet type descriptor in the packet descriptor data set stored based on results of said step of comparing to determine one of consecutive and overlapping data packets;

determining whether any packet descriptor data sets stored in the memory stages include a packet-type descriptor designating a complete data block; and reading out packet descriptor data sets with packet-type descriptors designating a complete data block from the memory stages.

5. A method for disassembling data blocks into a plurality of data packets and then assembling/reassembling the plurality of data packets as claimed in claim 4, wherein said step of inserting a packet descriptor data set into each data packet includes setting the packet-type descriptor of each packet descriptor data set as one of a START, a MIDDLE, an END and a COMPLETE packet type, and when said step of comparing to determine one of consecutive and overlapping data packets determines that the combination does constitute one of consecutive and overlapping data packets, said step of updating the packet-type descriptors in the prior packet descriptor data sets stored in the memory stages includes the steps of:

changing the packet-type descriptor to START when the packet-type descriptor of the first packet descriptor data is MIDDLE and the packet-type descriptor of the prior received packet descriptor data is START, changing the packet-type descriptor to COMPLETE when the packet-type descriptor of the first packet descriptor data is END and the packet-type descriptor of the prior received packet descriptor data is START, changing the packet-type descriptor to MIDDLE when the packet-type descriptor of the first packet descriptor data is MIDDLE and the packet-type descriptor of the prior received packet descriptor data is MIDDLE, changing the packet-type descriptor to END when the packet-type descriptor of the first packet descriptor data is END and the packet-type descriptor of the prior received packet descriptor data is MIDDLE, and maintaining a current packet-type descriptor for all other combinations of packet-type descriptors from the first and prior received packet descriptor data.

6. A method for disassembling data blocks into a plurality of data packets and then assembling/reassembling the plurality of data packets into data blocks as claimed in claim 4, wherein the memory stages are connected in parallel to each other, the method further comprising the step of:

shifting storage of packet descriptor data sets in the parallel plurality of memory stages after said reading out of packet descriptor data sets with packet-type descriptors designating a complete data block to cause only the lowermost stages of the parallel plurality of memory stages to be occupied.

7. A method for assembling/reassembling data blocks from a plurality of data packets as claimed in claim 1, the method further comprising the step of:

comparing the nth packet descriptor data with at least mth packet descriptor data to determine if the nth packet descriptor data is corrupted data and discarding the nth packet descriptor data if determined to be corrupted.

8. A method for disassembling and then assembling/reassembling data blocks from a plurality of data packets as claimed in claim 4, the method further comprising the step of:

comparing the first packet descriptor data set with the prior received packet descriptor data sets to determine if the first data packet is corrupted data and discarding the first data packet set if determined to be corrupted.

9. A device for assembling/reassembling data blocks from a plurality of data packets transmitted through a telecommunications network, each data packet having a packet descriptor data set describing identity, data sequence start, data sequence end, and packet type of a corresponding data packet, the device comprising:

means for receiving data packets to be assembled from the telecommunications network;

memory means connected to said means for receiving for storing at least m packet descriptor data sets from m data packets, said memory means including a plurality of memory stages connected in parallel with each memory stage being formed to store a single packet descriptor data set, where m is a number of received data packets; and a control circuit connected to said memory means and said receiving means, said control circuit controlling the receiving, storing, and outputting of data packets received from the network, wherein said control circuit includes means for extracting an nth packet descriptor data set from an nth data packet received from the network, means for comparing the nth packet descriptor data set with at least the mth packet descriptor data set stored in said memory means to determine at least one of if the nth packet descriptor data set and the mth packet descriptor data set are duplicates of each other, if the nth packet descriptor data is corrupted data, and if a combination of at least the nth data packet with the mth data packet constitutes one of consecutive and overlapping data packets of a data block, processing means for performing at least one of the following operation: discarding the nth packet descriptor data set if the nth packet descriptor data set is a duplicate of the mth packet descriptor data set, discarding the nth packet descriptor data set if the nth packet descriptor data set is corrupted data, and merging at least the nth and mth packet descriptor data sets if the combination of at least the nth data packet with the mth data packet constitutes one of consecutive and overlapping data packets of a data block, means for storing at least one of the nth packet descriptor data set and the combination of the nth and mth packet descriptor data sets in said memory means, means for updating the packet-type packet descriptor in packet descriptor data sets stored in said memory means based on results of the comparing means, means for determining whether any packet descriptor data sets stored in said memory means include a packet-type descriptor designating a complete data block, and for reading out packet descriptor data sets with packet-type descriptors designating a complete data block from said memory means, and means for shifting storage of packet descriptor data sets in said memory means after packet descriptor data sets with packet-type packet descriptor data designating a complete data block are read out to cause only lowermost stages of said memory means to be occupied.

10. A device for assembling/reassembling data blocks from a plurality of data packets transmitted through a telecommunications network according to claim 9, wherein each of said stages in said memory means includes a plurality of stage cells each connected to receive a predetermined packet descriptor from a packet descriptor data set inputted thereto, and a stage controller controlling receiving, outputting, and storing of packet descriptor data sets through the stage cells.

11. A system for disassembling data blocks into a plurality of data packets transmitted through a telecommunications network and assembling/reassembling the plurality of data packets into data blocks, the system comprising:

means for dividing a data block to be disassembled into a plurality of data packets, and for inserting a packet descriptor data set into each data packet, the packet descriptor data set including an identity descriptor, a data sequence start descriptor, a data sequence end descriptor, and a packet-type descriptor;

a first network interface connected to said means for dividing for transmitting the plurality of data packets to the network;

a second network interface for receiving the plurality of data packets from the networks;

memory means for storing prior packet descriptor data sets, said memory means including a plurality of memory stages connected in parallel with each other with each memory stage being formed to store a single packet descriptor data set; and a control circuit connected to said memory means and said second network interface, said control circuit controlling the receiving, storing, and outputting of data packets received from the network, wherein said control circuit includes means for extracting a first packet descriptor data set from a first data packet received from the network, means for comparing the first packet descriptor data set with at least one prior packet descriptor data set stored in said memory means to determine at least one of if the first packet descriptor set and the at least one prior packet descriptor data set are duplicates of each other, if the first packet descriptor data is corrupted data, and if a combination of at least the first data packet with the at least one prior received data packet constitutes one of consecutive and overlapping data packets of a data block, processing means for performing at least one of the following operations: discarding the first packet descriptor data set if the first packet descriptor data set is a duplicate of the at least one prior packet descriptor data set, discarding the first packet descriptor data set if the first packet descriptor data set is corrupted data, and combining at least the first and the at least one prior packet descriptor data set if the combination constitutes one of consecutive and overlapping data packets of a data block, means for storing at least one of the first packet descriptor data set, and the combination of the first and prior packet descriptor data sets in said memory means, means for updating the packet-type packet descriptor in packet descriptor data sets stored in said memory means based on results of the comparing means, means for determining whether any packet descriptor data sets stored in said memory means include a packet-type descriptor designating a complete data block, and for reading out packet descriptor data sets with packet-type descriptors designating a complete data block from said memory means, and means for shifting storage of packet descriptor data sets in said memory means after packet descriptor data sets with packet-type descriptors designating a complete data block are read out to cause only the lowermost stages of said memory means to be occupied.

12. A system for disassembling data blocks into a plurality of data packets transmitted through a telecommunications network and assembling/reassembling the plurality of data packets into data blocks according to claim 11, wherein each of said stages in said memory means includes a plurality of stage cells each connected to receive a predetermined packet descriptor from a packet descriptor data set inputted thereto, and a stage controller controlling receiving, outputting, and storing of packet descriptor data sets through the stage cells.

13. A system for disassembling data blocks into a plurality of data packets transmitted through a telecommunications network and assembling/reassembling the plurality of data packets into data blocks according to claim 11, further comprising:

a disassembly adaptor circuit connected to an input of said memory means so as to interface said memory means with said means for dividing a data block to be disassembled.

14. A method for sending data through a telecommunications network between a transmitting station and a receiving station, the method comprising the steps of:

dividing a data block into a plurality of data packets at the transmitting station;

inserting a packet descriptor data set into each data packet;

transmitting the plurality of data packets through the network;

extracting the packet descriptor data set from the data packet when received at the receiving station;

comparing the packet descriptor data set with prior packet descriptor data sets stored in memory to determine if there is duplicative or overlapping data;

updating the packet descriptor data set relative to the prior packet descriptor data sets based on a result of said step of comparing with the prior packet descriptor data sets;

storing the packet descriptor data set in one of a plurality of memory stages based on the result of said step of comparing with prior packet descriptor data sets;

determining whether any packet descriptor data sets stored in the plurality of memory stages designate a complete data block; and reading out from the memory stages packet descriptor data sets designating a complete data block.

15. A method for sending data through a telecommunications network according to claim 14, said method further comprising the step of:

determining if the received data packet is corrupted data and discarding the received data packet set if determined to be corrupted.

16. A method for sending data as claimed in claim 14, wherein said steps of comparing the packet descriptor data set with prior packet descriptor data sets and updating the packet descriptor data set further include the steps of determining if the packet descriptor data set is a duplicate of any of the prior packet descriptor data sets stored in memory and discarding the packet descriptor data set if determined to be a duplicate of at least one prior packet descriptor data set, and determining if a combination of the packet descriptor data set with at least one prior packet descriptor data set constitutes one of consecutive and overlapping data packets of a data block, and combining the packet descriptor set and at least one prior packet descriptor data set if determined to constitute one of consecutive and overlapping data packets.

17. A system for transmitting data through a telecommunications network, the system comprising:

means for dividing a data block into a plurality of data packets, and for inserting a packet descriptor data set into each data packet;

a first network interface connected to said means for dividing for transmitting the plurality of data packets to the network;

a second network interface for receiving a plurality of data packets from the network;

memory means for storing prior packet descriptor data sets, said memory means including a plurality of memory stages connected in parallel with each memory stage being formed to store a single packet descriptor data set; and a control circuit connected to said memory means and said second network interface, said control circuit including means for comparing a packet descriptor data set of a received data packet with at least one prior packet descriptor data set stored in said memory means, processing means for updating the packet descriptor data set based on an output from the comparing means, and means for determining whether any packet descriptor data sets stored in said memory means designate a complete data block and for reading out from said memory means packet descriptor data sets designating a complete data block.

18. A system for transmitting data as claimed in claim 17, wherein the comparing means of said control circuit includes means for determining at least one of if the data packet is a duplicate of a prior received data packet, if the data packet is corrupted data, and if a combination of at least the data packet with the at least one prior received data packet constitutes consecutive data packets of a data block.

19. A system for transmitting data as claimed in claim 18, wherein the processing means of said control circuit includes means for performing at least one of the following operations: discarding the packet descriptor data set if the packet descriptor data set is a duplicate of the at least one prior packet descriptor data set, discarding the packet descriptor data set if the packet descriptor data set is corrupted data; and merging at least the packet descriptor data set and the at least one prior packet descriptor data set if the combination constitutes one of consecutive and overlapping data packets of a data block.

20. A system for transmitting data as claimed in claim 17, wherein said control circuit further includes means for shifting storage of packet descriptor data sets in said memory means after packet descriptor data sets with packet-type descriptors designating a complete data block are read out.

21. A system for transmitting data as claimed in claim 17, wherein each of said stages in said memory means includes a plurality of stage cells and a stage controller controlling receiving, outputting and storing of packet descriptor data sets through the stage cells.

22. A system for transmitting data as claimed in claim 17, further comprising:

a disassembly adaptor circuit connected to an input of said memory means so as to interface said memory means with said means for dividing a data block.

* * * * *